3,151,153
PREPARATION OF SULFOBENZENE CARBOXYLIC ACID

Willis C. Keith, Lansing, and Robert R. Chambers, Homewood, Ill., assignors, by mesne assignments, to Sinclair Research, Inc., New York, N.Y., a corporation of Delaware
No Drawing. Filed Sept. 30, 1958, Ser. No. 764,257
7 Claims. (Cl. 260—507)

This invention relates to the production of sulfo-aromatic carboxylic acids, i.e., having a sulfonic acid radical attached to the aromatic ring, and more particularly to a process for the liquid phase oxidation of salts of alkylated benzene sulfonic acids while in the presence of molecular oxygen and a bromide catalyst.

Sulfo-aromatic carboxylic acids such as sulfo-phthalic acids have been used to some extent by the leather tanning industry and also for making internal dyes for synthetic fibers. Moreover, these compounds have been recognized as possessing high potential in the fields of high polymer, plastics and synthetic fiber production. Until now sulfo-aromatic acids have been prepared by treating an aromatic anhydride at high temperatures with fuming sulfuric acid and more recently by nitric acid oxidation. Although these appear to be good methods for the preparation of sulfo-aromatic acids, such as sulfophthalic acids, objections have been raised primarily to the cost of employing these reagents to supply the necessary oxygen for the reaction. Therefore, until now the need for a good catalytic air oxidation process has existed.

In accordance with the present invention we have found that good yields of sulfo-benzene carboxylic acids can be obtained if a feedstock consisting essentially of a salt of an alkylated benzene sulfonic acid is oxidized in the liquid phase with a free oxygen-containing gas at temperatures of about 100 to 300° C., preferably 150 to 250° C., and pressures sufficient to maintain the liquid phase while in the presence of a bromide catalyst. This invention is particularly applicable to the oxidation of toluene and xylene sulfonic acids salts.

By an alkylated benzene sulfonic acid is meant any alkyl substituted benzene hydrocarbon which has been sulfonated as, for example, by treatment with fuming sulfuric acid. The aromatic sulfonic acid feedstock to be oxidized can contain only one alkyl radical or it can contain a plurality of alkyl radicals if desired. Although the methyl radical is preferred, the alkyl substituent can be ethyl, propyl, isopropyl, butyl or isobutyl, i.e., oxidizable alkyl groups of 1 to 4 carbon atoms (see U.S. Patent No. 2,833,816 to Saffer et al.). Also, the alkyl radicals can be substituted as with chlorine or bromine and the aromatic ring of the acid can contain other substituents such as halogens, nitro and carboxylic groups. Representative aromatic sulfonic acids, the salts of which can be oxidized in accordance with the present invention, are toluene sulfonic acid, xylene sulfonic acid, ethyl methyl benzene sulfonic acid, etc. It should be noted that free sulfonic acids cannot be advantageously employed in the oxidation reaction of the present invention due to the formation of undesirable products. Thus, it has been found desirable to use salts of the sulfonic acids of the present invention, that is the ammonium (including amines) salts and the alkaline metal salts such as the alkali metal and alkaline earth metal salts.

As mentioned previously, the oxidation reaction of the present invention is carried out in the presence of a bromide catalyst. The catalyst can be provided by adding catalytic amounts of bromine in the combined, ionic or elemental form. The preferred bromide catalysts of this invention are hydrogen bromide, in particular, and metal bromides. Hydrogen bromide may be introduced as such to the system, or it can be formed in-situ during the course of the reaction. For instance, materials such as free bromine, alkyl bromides, hypobromous acid can be introduced in the system and under the reaction conditions they will form hydrogen bromide. The amount of bromide provided in the system will be that sufficient to catalyze the reaction and can vary over a wide range. Generally, the catalyst will be present in amounts ranging from as low as about 0.001 mole percent up to as high as about 25.0 mole percent based on the sulfonic acid salt feedstock. When metal bromide is used as a catalyst, it is preferred to employ a solvent such as acetic acid or other organic acids stable at reaction conditions. The bromides of elements of atomic numbers 23 through 28 serve as particularly useful catalysts for the metal bromide catalyzed reaction with cobaltous bromide being preferred. Other metal bromides are satisfactory for this reaction, especially the elements of the lanthanide series. The amount of metal bromide catalyst is usually varied from about 0.001 to 10 mole percent based on the sulfonic acid feedstock.

In order to obtain the desired yields of sulfo-aromatic carboxylic acids in accordance with the present invention, it is advantageous to conduct the oxidation reaction in a medium which effects the solubilization of the reactants. More particularly, the oxidation reaction is preferably carried out in the presence of water or organic acids stable at the reaction conditions, for instance acetic acid, benzoic acid, etc. and mixtures of these materials. Although the use of water or any of these organic acids alone is effective, water is preferred, particularly when hydrogen bromide is used as the catalyst. When metal bromide is used as the catalyst, however, it is advantageous to utilize instead of water one of the aforementioned organic solvents stable under the reaction conditions. The amount of solvent employed in the oxidation reaction will depend primarily upon the choice of solvents and the solubility of the particular feedstock therein. It is not necessary that the solvent be provided in amounts sufficient to solubilize the entire charge of feedstock but enough must be present to render a sufficient amount of the feedstock in solution in order to effect the oxidation, with additional amounts of the feedstock being solubilized as the reaction products are formed. Generally, the solvent will be provided in amounts ranging from about 25 to 2000 or more percent by weight of the feedstock and preferably about 100 to 500 percent by weight.

The conditions under which the oxidation reaction is conducted are, for example, temperatures of about 100 to 300° C. and preferably about 150 to 250° C. with a pressure on the system sufficient to maintain the liquid phase at the operating temperature, usually about 0 to 3000 p.s.i.g. and preferably about 500 to 1000 p.s.i.g. sufficing. Oxygen or oxygen-containing gas is introduced into the reaction zone to effect the oxidation. The conversion in such a system will generally be complete after contact periods ranging from about 1 minute to 10 hours.

The present invention can best be illustrated by the following examples which are not to be considered limiting.

In each of the examples shown in Table I below, .025 mole of the indicated sulfonic acid salt, 18 grams of the indicated solvent and 1.9 to 10 moles of the indicated catalyst were charged to a 120 ml. glass tube sealed at both ends and mounted inside a 300 ml. shaker bomb. The bomb was closed and oxygen-enriched gas (60% oxygen–40% nitrogen) was introduced through a small hole in the top side of the glass tube until a pressure of about 300 p.s.i.g. was obtained. Heat was applied and a temperature of about 200° C. was reached. The reaction was controlled at this temperature for about 2 hours. At the end of this time, the bomb was placed in cold water and after cooling to about room temperature, the contents of the tube were removed. The insoluble acid was recovered from the solvent by filtration. The precipitated acid was washed with methyl alcohol to remove any unreacted aromatic acid. The insoluble acid was dried at 125° C. The yields and description of the corresponding acid of the alkylated aromatic sulfonic acid are noted below:

*Table I*

| Example No. | Feed | Solvent | Catalyst Compound | Mole Percent | Products and Description |
|---|---|---|---|---|---|
| 1 | p-xylene-SO₃NH₄ | H₂O | HBr | 10 | 92 percent of theory yield of terephthalic acid ammonium sulfonate was obtained. Product slightly colored. Analysis: Calculated, 36.4% C, 12.1% S, 5.32% N, and Sap. No. 640; Found, 36.3% C, 12.1% S, 5.2% N and Sap. No. 619. |
| 2 | p-xylene-SO₃Na | H₂O | HBr | 10 | The yield of terephthalic acid-sodium sulfonate was not determined, but the crude product was of high purity. Analysis: Calculated, 35.6% C and Sap. No. 417; Found, 34.6% C and Sap. No. 400. |
| 3 | p-toluene-SO₃K | H₂O | HBr | 5 | A quantitative yield of p-benzoic-potassium sulfonate was obtained. Product was of high purity. Analysis: Calculated, 35.0% C and Sap. No. 233; Found, 34.5% C and Sap. No. 241. |
| 4 | p-xylene-SO₃K | H₂O | HBr | 5 | A quantitative yield of terephthalic acid-potassium sulfonate was obtained. Product was of high purity. Analysis: Calculated, 33.75% C and Sap. No. 395; Found, 33.78% C and Sap. No. 389. |
| 5 | m-xylene-SO₃K | H₂O | HBr | 10 | An 88% of theory yield of isophthalic acid-potassium sulfonate was obtained. Product was slightly colored. Analysis: Calculated, 33.75% C and Sap. No. 395; Found, 32.5% C and Sap. No. 364. |
| 6 | p-xylene-SO₃K | CH₃COOH | CoBr₂ | 1.9 | A yield of 67% of theory of terephthalic acid-potassium sulfonate was obtained. The yield was low partially due to mechanical losses. Analysis: Calculated, Sap. No. 395; Found, Sap. No. 352. |

The data clearly indicate that near quantitative yields of the various sulfo-phthalic acids can be obtained in high purity by the process of the present invention.

It is claimed:

1. A method for oxidizing to a carboxyl group at least one alkyl radical of a benzene sulfonic acid salt having at least one oxidizable alkyl radical containing from 1 to 4 carbon atoms which comprises oxidizing in the presence of molecular oxygen and in the liquid phase a feedstock consisting essentially of a benzene sulfonic acid salt, said salt being selected from the group consisting of ammonium and alkali metal salts, at a temperature of about 100 to 300° C. while in the presence of a bromide catalyst.

2. The method of claim 1 in which the catalyst is hydrogen bromide and the reaction is conducted in the presence of water.

3. The method of claim 1 in which the catalyst is cobaltous bromide and the reaction is conducted in the presence of acetic acid.

4. The method of claim 1 wherein the salt selected is ammonium salt.

5. The method of claim 1 wherein the salt selected is alkali metal salt.

6. The method of claim 1 in which the alkyl benzene sulfonic acid salt is the ammonium salt of xylene sulfonic acid.

7. The method of claim 1 in which the alkyl benzene sulfonic acid salt is an alkali metal salt of xylene sulfonic acid.

References Cited in the file of this patent

UNITED STATES PATENTS

| | | |
|---|---|---|
| 2,444,924 | Farkas et al. | July 13, 1948 |
| 2,559,147 | Emerson et al. | July 3, 1951 |
| 2,833,816 | Saffer et al. | May 6, 1958 |
| 2,860,143 | Thompson | Nov. 11, 1958 |
| 2,860,162 | Thuresson | Nov. 11, 1958 |
| 2,907,792 | McIntyre | Oct. 6, 1959 |
| 2,959,613 | Whitfield | Nov. 8, 1960 |